US009957200B2

(12) United States Patent
Beall et al.

(10) Patent No.: US 9,957,200 B2
(45) Date of Patent: May 1, 2018

(54) COMPOSITION FOR IMPROVED MANUFACTURE OF SUBSTRATES

(71) Applicant: CORNING INCORPORATED, Corning, NY (US)

(72) Inventors: Douglas Munroe Beall, Painted Post, NY (US); Gregg William Crume, Canandaigua, NY (US); James Anthony Feldman, Campbell, NY (US); Christopher John Malarkey, Corning, NY (US); Elizabeth Marie Vileno, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days. days.

(21) Appl. No.: 15/038,971

(22) PCT Filed: Nov. 26, 2014

(86) PCT No.: PCT/US2014/067522
§ 371 (c)(1),
(2) Date: May 24, 2016

(87) PCT Pub. No.: WO2015/081147
PCT Pub. Date: Jun. 4, 2015

(65) Prior Publication Data
US 2016/0376200 A1 Dec. 29, 2016

Related U.S. Application Data

(60) Provisional application No. 61/909,497, filed on Nov. 27, 2013.

(51) Int. Cl.
*B01J 21/06* (2006.01)
*B01J 23/22* (2006.01)
(Continued)

(52) U.S. Cl.
CPC .......... *C04B 35/66* (2013.01); *B01D 46/2418* (2013.01); *B01D 53/94* (2013.01);
(Continued)

(58) Field of Classification Search
CPC ........ B01J 21/063; B01J 21/066; B01J 23/22; B01J 23/28; B01J 23/30; B01J 23/34;
(Continued)

(56) References Cited

U.S. PATENT DOCUMENTS 5,344,799 A * 9/1994 Wu ............................ C03C 1/00
264/176.1
5,925,308 A * 7/1999 Fewkes ................. B22F 1/0059
264/623

(Continued)

FOREIGN PATENT DOCUMENTS

CN 101474565 3/2012

OTHER PUBLICATIONS

PCT Notification of Transmittal of the International Search Report and The Written Opinion of the International Searching Authority, international application No. PCT/US2014/067522, dated Apr. 10, 2015, 12 pages.
(Continued)

*Primary Examiner* — Cam N. Nguyen
(74) *Attorney, Agent, or Firm* — Jakub M. Michna

(57) ABSTRACT

A ceramic precursor batch composition, green ware formed thereof, porous ceramic honeycomb article formed thereof, and methods of making same.

19 Claims, 4 Drawing Sheets

(51) Int. Cl.

| | | |
|---|---|---|
| *B01J 23/28* | (2006.01) | |
| *B01J 23/30* | (2006.01) | |
| *B01J 23/34* | (2006.01) | |
| *B01J 23/42* | (2006.01) | |
| *B01J 23/44* | (2006.01) | |
| *B01J 23/72* | (2006.01) | |
| *B01J 23/755* | (2006.01) | |
| *B01J 37/00* | (2006.01) | |
| *B01J 35/00* | (2006.01) | |
| *B01J 35/04* | (2006.01) | |
| *C04B 35/46* | (2006.01) | |
| *C04B 35/48* | (2006.01) | |
| *C04B 35/66* | (2006.01) | |
| *C04B 35/82* | (2006.01) | |
| *C04B 38/00* | (2006.01) | |
| *B01D 46/24* | (2006.01) | |
| *B01D 53/94* | (2006.01) | |
| *B01J 37/08* | (2006.01) | |
| *C04B 111/00* | (2006.01) | |

(52) U.S. Cl.
CPC .......... *B01J 21/063* (2013.01); *B01J 23/42* (2013.01); *B01J 35/0006* (2013.01); *B01J 35/04* (2013.01); *B01J 37/0018* (2013.01); *B01J 37/082* (2013.01); *C04B 35/46* (2013.01); *C04B 35/48* (2013.01); *C04B 35/82* (2013.01); *C04B 38/0006* (2013.01); *B01D 2255/915* (2013.01); *C04B 2111/0081* (2013.01); *C04B 2111/00793* (2013.01); *C04B 2235/3232* (2013.01); *C04B 2235/48* (2013.01); *C04B 2235/5216* (2013.01); *C04B 2235/6023* (2013.01)

(58) Field of Classification Search
CPC ... B01J 23/42; B01J 23/44; B01J 23/72; B01J 23/755; B01J 37/0018; B01J 37/082; B01J 35/0006; B01J 35/04; C04B 35/46; C04B 35/48; C04B 35/66; C04B 35/82; C04B 38/0006
See application file for complete search history.

(56) References Cited

U.S. PATENT DOCUMENTS

| | | | | |
|---|---|---|---|---|
| 6,080,345 | A * | 6/2000 | Chalasani | B28B 3/269 264/109 |
| 6,113,829 | A * | 9/2000 | Bookbinder | B28B 3/269 264/177.11 |
| 6,200,517 | B1 * | 3/2001 | Peng | C04B 35/185 264/630 |
| 6,207,101 | B1 * | 3/2001 | Beall | C04B 35/185 264/630 |
| 6,221,308 | B1 * | 4/2001 | Peng | B22F 3/22 264/630 |
| 6,372,033 | B1 * | 4/2002 | Chalasani | B28B 3/269 106/140.1 |
| 7,442,425 | B2 * | 10/2008 | Fu | B01D 46/2429 264/44 |
| 7,497,982 | B2 * | 3/2009 | Chou | C04B 35/195 264/631 |
| 7,572,749 | B2 * | 8/2009 | Beeckman | B01J 20/183 502/159 |
| 7,713,897 | B2 * | 5/2010 | Ogunwumi | C04B 35/478 501/105 |
| 7,776,786 | B2 | 8/2010 | DiFrancesco et al. | |
| 7,932,201 | B2 * | 4/2011 | Ogunwumi | C04B 35/478 501/107 |
| 8,097,546 | B2 * | 1/2012 | Niinobe | C04B 35/195 264/638 |
| 8,133,422 | B2 * | 3/2012 | Beauseigneur | C04B 35/185 106/162.8 |
| 8,137,633 | B2 | 3/2012 | DiFrancesco et al. | |
| 8,277,737 | B2 | 10/2012 | DiFrancesco et al. | |
| 8,354,055 | B2 * | 1/2013 | Bayer | B01J 35/04 264/638 |
| 8,623,128 | B2 * | 1/2014 | Bayer | B01J 35/04 106/162.5 |
| 8,697,222 | B2 * | 4/2014 | Fu | B01D 46/2429 428/116 |
| 8,728,224 | B2 * | 5/2014 | Niinobe | C04B 35/565 106/197.01 |
| 8,741,210 | B2 * | 6/2014 | Merkel | B01J 23/40 264/630 |
| 8,821,624 | B2 * | 9/2014 | Niinobe | B28B 3/269 106/172.1 |
| 8,968,639 | B2 * | 3/2015 | Bayer | C04B 35/6263 264/638 |
| 9,034,787 | B2 * | 5/2015 | Boek | B01D 53/88 502/100 |
| 9,126,871 | B2 * | 9/2015 | McCauley | C04B 35/478 |
| 9,353,011 | B2 * | 5/2016 | Bayer | B29C 47/0028 |
| 9,365,702 | B2 * | 6/2016 | Bayer | C04B 35/6263 |
| 9,580,581 | B2 * | 2/2017 | Adden | B01J 37/0018 |
| 2007/0254798 | A1 * | 11/2007 | Addiego | C04B 35/185 501/119 |
| 2009/0092786 | A1 | 4/2009 | Liu et al. | |
| 2009/0218711 | A1 * | 9/2009 | Dasher | C04B 35/195 264/43 |
| 2009/0274866 | A1 * | 11/2009 | Fabian | C04B 35/111 428/116 |
| 2010/0029462 | A1 * | 2/2010 | DeRosa | C04B 35/478 501/80 |
| 2010/0295218 | A1 | 11/2010 | Dotzel et al. | |
| 2011/0044873 | A1 | 2/2011 | Ahn et al. | |
| 2011/0045233 | A1 | 2/2011 | Gray et al. | |
| 2011/0245062 | A1 * | 10/2011 | Hayakawa | C04B 35/111 501/1 |
| 2011/0262689 | A1 * | 10/2011 | Bayer | C04B 35/195 428/116 |
| 2012/0087835 | A1 | 4/2012 | Trefzger et al. | |
| 2012/0220445 | A1 * | 8/2012 | Uoe | C04B 35/478 501/134 |
| 2012/0241998 | A1 * | 9/2012 | Suzuki | C04B 35/478 264/239 |
| 2012/0252659 | A1 | 10/2012 | DiFrancesco et al. | |
| 2013/0043624 | A1 * | 2/2013 | Kan | B01D 39/2075 264/653 |
| 2013/0133550 | A1 | 5/2013 | Derosa | |
| 2013/0237413 | A1 * | 9/2013 | Szillat | B01J 32/00 502/439 |
| 2014/0199482 | A1 * | 7/2014 | Cai | C04B 28/001 427/243 |
| 2014/0357473 | A1 * | 12/2014 | Bischof | B01D 53/9418 502/64 |
| 2014/0357474 | A1 * | 12/2014 | Boger | C04B 35/195 502/67 |
| 2014/0357476 | A1 * | 12/2014 | Bischof | C04B 35/195 502/75 |
| 2015/0028526 | A1 * | 1/2015 | Bayer | C04B 35/6365 264/630 |

OTHER PUBLICATIONS

Pritchard, S., et al., "Optimizing SCR Catalyst Design and Performance for Coal-Fired Boilers", EPA/EPRI 1995, Joint Symposium, Stationary Combustion NOx Control, May 16-19, 1995, 23 pages.
Anwar, J., et al., "Microwave chemistry: Effect of ions on dielectric heating in microwave ovens", Arabian Journal of Chemistry, 2011, 5 pages.
Kulazynski, M., et al., "Selective Catalytic Reduction NO By Ammonia Over Ceramic and Active Carbon Based Catalysts", Heat Analysis and Thermodynamic Effects, 2011, pp. 351-394.

\* cited by examiner

COMPOSITION FOR IMPROVED MANUFACTURE OF SUBSTRATES

This application claims the benefit of priority under 35 U.S.C. § 365 of International Patent Application Serial No. PCT/US2014/067522 filed on Nov. 26, 2014, which claims the benefit of 35 U.S.C. § 119 of U.S. Provisional Application Ser. No. 61/909,497 filed on Nov. 27, 2013, the contents of which are relied upon and incorporated herein by reference in their entirety as if fully set forth below.

BACKGROUND

Field

Exemplary embodiments of the present disclosure relate to ceramic precursor batch compositions, green ware formed thereof, porous ceramic honeycomb articles formed thereof, and methods of making same.

Discussion of the Background

The toxicity of nitrogen oxides and their role in the formation of acid rain and tropospheric ozone have resulted in the imposition of strict standards limiting the discharges of these chemical species. To meet these standards, it is generally necessary to remove at least part of these oxides present in exhaust or flue gases from stationary or mobile combustion sources.

Denitration or selective catalytic reduction (SCR) technology is commonly applied to combustion-derived gases for removal of nitrogen oxides. Selective catalytic reduction generally comprises the reaction of nitrogen oxide species in the gases, such as nitric oxide (NO) and/or nitrogen dioxide ($NO_2$), with a nitrogen containing reductant, such as ammonia or urea, resulting in the production of nitrogen gas ($N_2$) and water.

SUMMARY

Exemplary embodiments of the present disclosure provide a ceramic precursor batch composition.

Exemplary embodiments of the present disclosure also provide a ceramic green ware body.

Exemplary embodiments of the present disclosure also provide a method of manufacturing a ceramic green ware body.

Exemplary embodiments of the present disclosure also provide a method of manufacturing porous ceramic honeycomb articles.

Additional features of the disclosure will be set forth in the description which follows, and in part will be apparent from the description, or may be learned by practice of the disclosure.

An exemplary embodiment discloses a ceramic precursor batch composition including inorganic ceramic-forming ingredients comprising 50-98.9 wt % an inorganic oxide composition, and the batch composition comprises a soluble ion concentration of less than 0.75 molar.

An exemplary embodiment also discloses a ceramic green ware body including a plurality of channels, inorganic ceramic-forming ingredients comprising 50-98.9 wt % an inorganic oxide composition and the ceramic green ware body comprises a soluble ion concentration of less than 0.75 molar.

An exemplary embodiment also discloses a method of making a ceramic green ware body including mixing inorganic ceramic-forming ingredients comprising 50-98.9 wt % an inorganic oxide composition with a liquid vehicle to form a precursor batch. Forming the precursor batch into a structure comprising a plurality of channels to form a wet ceramic green ware body wherein the wet ceramic green ware body comprises a soluble ion concentration of less than 0.75 molar. The method includes drying the wet ceramic green ware body to form the ceramic green ware body.

An exemplary embodiment also discloses a porous ceramic honeycomb article formed by firing the green ware body.

It is to be understood that both the foregoing general description and the following detailed description are exemplary and explanatory and are intended to provide further explanation of the disclosure.

BRIEF DESCRIPTION OF THE FIGURES

The accompanying drawings, which are included to provide a further understanding of the disclosure and are incorporated in and constitute a part of this specification, illustrate exemplary embodiments of the disclosure, and together with the description serve to explain the principles of the disclosure.

DETAILED DESCRIPTION

Figure 1:
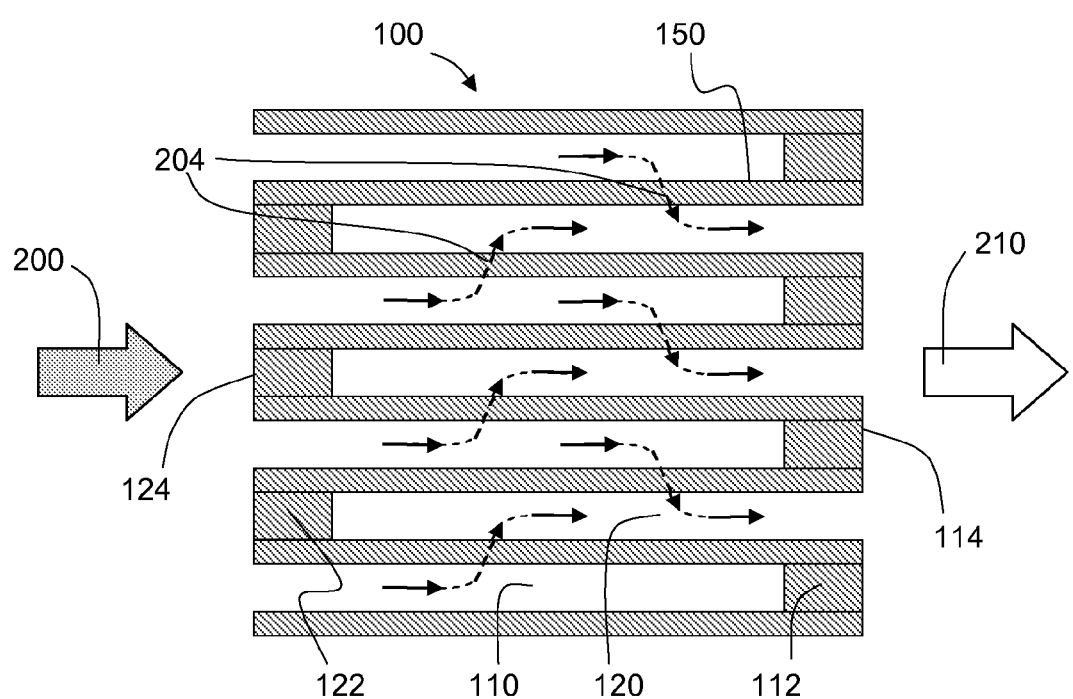
FIG. 1 depicts a schematic cross-sectional representation of a wall-flow filter structure.

The disclosure is described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these embodiments are provided so that this disclosure is thorough, and will fully convey the scope of the disclosure to those skilled in the art. In the drawings, the size and relative sizes of layers and regions may be exaggerated for clarity. It will be understood that when an element or layer is referred to as being "on", "connected to", or "adjacent to" another element or layer, it can be directly on, directly connected to, or directly adjacent to the other element or layer, or intervening elements or layers may be present. In contrast, when an element or layer is referred to as being "directly on", "directly connected to", or "directly adjacent to" another element or layer, there are no intervening elements or layers present. Like reference numerals in the drawings denote like elements. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

In these exemplary embodiments, the disclosed composition, body, apparatus, or system, and the disclosed method of using the composition, body, apparatus, or system provide one or more advantageous features or aspects, including for example as discussed below. Features or aspects recited in any of the claims are generally applicable to all facets of the disclosure. Any recited single or multiple feature or aspect in any one claim can be combined or permuted with any other recited feature or aspect in any other claim or claims.

While terms such as, top, bottom, side, upper, lower, vertical, and horizontal are used, the disclosure is not so limited to these exemplary embodiments. Instead, spatially relative terms, such as "top", "bottom", "horizontal", "vertical", "side", "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"Include," "includes," or like terms means encompassing but not limited to, that is, inclusive and not exclusive.

"About" or "substantially" modifying, for example, the quantity of an ingredient in a composition, concentrations, volumes, process temperature, process time, yields, flow rates, pressures, viscosities, and like values, and ranges thereof, employed in describing the embodiments of the disclosure, refers to variation in the numerical quantity that can occur, for example: through typical measuring and handling procedures used for preparing materials, compositions, composites, concentrates, or use formulations; through inadvertent error in these procedures; through differences in the manufacture, source, or purity of starting materials or ingredients used to carry out the methods; and like considerations. The term "about" or "substantially" also encompasses amounts that differ due to aging of a composition or formulation with a particular initial concentration or mixture, and amounts that differ due to mixing or processing a composition or formulation with a particular initial concentration or mixture.

"Consisting essentially of" in embodiments can refer to, for example, in a process for operating an axial skinning apparatus as defined and disclosed herein, an apparatus for making the skinned article, the method of making a skinned article, the resulting skinned article, the compositions, or the formulations, of the disclosure can include the components or steps listed in the claim, plus other components or steps that do not materially affect the basic and novel properties of the compositions, articles, apparatus, or methods of making and use of the disclosure, such as particular compositions, particular additives or ingredients, a particular agent, a particular surface modifier or wetting agent or condition, or like structure, material, or process variable selected.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "RT" for room temperature, "nm" for nanometers, and like abbreviations).

Specific values disclosed for components, ingredients, additives, times, temperatures, pressures, and like aspects, and ranges thereof, are for illustration only; they do not exclude other defined values or other values within defined ranges. The apparatus, and methods of the disclosure can include any value or any combination of the values, specific values, more specific values, and exemplary values described herein.

As used herein, the term "soluble" refers to a first medium (e.g., solute) having a solubility in a second medium (e.g., solvent) of at least 0.1 mole per liter at 25° C. As used herein, the term "insoluble" refers to a first medium (e.g., solute) having a solubility in a second medium (e.g., solvent) of less than 0.001 mole per liter at 25° C. As used herein, the term "partially soluble" refers to a first medium (e.g., solute) having a solubility in a second medium (e.g., solvent) of at least 0.001 mole per liter but less than 0.1 mole per liter at 25° C.

It will be understood as used herein the term "ceramic green ware body" for the purposes of this disclosure can be construed as an unfired article comprising a ceramic precursor material substantially held together by a binder. Additional components may be present in the ceramic precursor (batch) to adjust rheological properties and to aid formation of pores with the desired structure. As a porous ceramic honeycomb is obtained only after chemical reaction of at least some of the raw materials during the high temperature thermal treatment, prior to that treatment, the honeycomb structures and batch material may be referred to as being in the "green" state and the article as "green ware". The green ware may be wet ceramic green ware or dried ceramic green ware. While not required in all aspects, the chemical reaction of the raw materials during the high temperature thermal treatment described herein includes sintering of particles to each other where the particles may maintain their original composition, as well as reactions where the raw materials are completely reacted, to form the porous ceramic honeycomb material.

Honeycomb structures formed from ceramic materials have a number of important uses including use as catalyst supports for controlling emissions from combustion engines and stationary pollution sources such as power plants. The honeycomb structures can support catalysts added after formation or include catalysts in the batch composition that forms the honeycomb structure. Honeycomb structures are also used as porous particulate filter bodies for the filtration of particulate-laden exhaust gases emitted by combustion engines such as diesel engines. The bodies can be modified through the sealing or plugging of the ends of selected cells of the honeycombs to provide a manifold "wall-flow" filter structure. A cross-sectional representation of such a "wall-flow" filter structure is shown in FIG. 1.

The fabrication of such filters typically involves plugging or otherwise sealing one end of each of the channels or cells traversing a porous ceramic honeycomb body 100, a first subset of channels or cells (i.e., "inlet channels") 110 being sealed or plugged 112 at a first or outlet end face 114 of the honeycomb and the remaining channels or cells (i.e., "outlet channels") 120 being sealed or plugged 122 at a second or opposing inlet end face 124 thereof. A particulate-contaminated fluid such as an exhaust gas 200 is supplied under pressure to the inlet face and enters the body via those cells which have an open end at the inlet end face 124. Because these cells are sealed at the opposite end face (outlet end face 114) of the body, the contaminated fluid is forced through the thin, porous walls 150 into adjoining cells (through-wall flow 204) which are sealed at the inlet end face 124 and open at the outlet end face 114. The solid particulate contaminant in the fluid which is too large to pass through the porous openings in the walls is left behind and a cleansed fluid 210 exits the filter body through the outlet cells for use. In the case of honeycombs with square channel cross-sections a masking design can be used that produces a checkerboard pattern of plugs in each end of the honeycombs, such that each inlet cell is surrounded on four sides by outlet cells, and vice versa.

Honeycomb bodies, according to exemplary embodiments of the disclosure, can comprise an outer peripheral wall and a plurality of inner partition walls arranged within the outer peripheral wall. The inner partition walls define a cell opening size and delineate a plurality of flow channels, which extend longitudinally through the catalyst body. The outer peripheral and inner partition walls can be formed from a ceramic precursor batch composition.

Extruded substrates for vanadium selective catalytic reduction (SCR) applications may use extrusion aids. It was discovered that these extrusion aids that are often complex organic extrusion aids do not lend themselves to economic drying and extrusion of honeycomb structure having thin walls and high cell density. For example, honeycomb structures having walls less than 9-10 mils (0.23-0.25 mm) thick and cell densities greater than 40 cells per $in^2$ (cpsi) (6.2 cells per $cm^2$) may be difficult to produce. On the other hand, elimination of extrusion aids that contribute soluble ions (soluble species) to batch composition has surprisingly lead to economic drying and extrusion of honeycomb structure having thin walls and high cell density. Exemplary embodiments of this disclosure also apply to honeycomb structure having walls greater than 9-10 mils (0.23-0.25 mm) thick and cell densities less than 40 cells per $in^2$ (cpsi) (6.2 cells per $cm^2$) that can be economically extruded and dried as well.

Exemplary embodiments of the disclosure provide a ceramic precursor batch composition for a honeycomb body such as a structural catalyst body (substrate). For purposes of this disclosure "honeycomb body" includes honeycomb monoliths and honeycomb bodies formed by multiple honeycomb segments that are secured together, such as by using a ceramic cement. The ceramic precursor batch composition includes inorganic ceramic-forming ingredients comprising 50-99.9 wt % an inorganic oxide composition and the ceramic precursor batch composition can include at least one of a temperature gelling cellulose ether and a soluble ion concentration of less than 0.75 molar. The ceramic precursor batch composition can also include at least 0.1 wt % a catalytically active functional group. In alternative exemplary embodiments, the catalytically active functional group can be added after formation of the honeycomb body.

In these exemplary embodiments, the temperature gelling cellulose ether can be a cellulose-based polymer comprising at least one of methylcellulose, hydroxy-ethyl-methylcellulose, and hydroxy-propyl-methylcellulose. The cellulose-based polymer can be present in 1 to 10 parts by weight based on the sum of the inorganic ceramic-forming ingredients being present in 100 parts by weight. For example, the cellulose-based polymer can be present in 1 to 5 parts by weight based on the sum of the inorganic ceramic-forming ingredients present in 100 parts by weight or even present in 2.25 to 3.25 parts by weight based on the sum of the inorganic ceramic-forming ingredients present in 100 parts by weight.

In these exemplary embodiments, the ceramic precursor batch composition can be substantially free of soluble ions (soluble species). It was discovered that the soluble ions in the batch composition tend to interfere with extrusion of ceramic precursor batch through dies and drying of wet green ware, for example, preventing microwave drying. The ceramic precursor batch composition according to exemplary embodiments of the disclosure can comprise a soluble ion concentration of less than 0.75 molar. The low soluble ion concentration was found to increase drying efficiency and facilitate extrusion of honeycomb structure having thin walls and high cell density. For example, the ceramic precursor batch composition can comprise a soluble ion concentration of less than 0.1 molar, less than 0.01 molar, or even a soluble ion concentration of less than $10^{-3}$ molar. The ceramic precursor batch composition substantially free of soluble ions refers to the soluble ion concentration of less than 0.75 molar, less than 0.1 molar, less than 0.01 molar, less than $10^{-3}$ molar, or even less than $10^{-7}$ molar. For example, the ceramic precursor batch composition substantially free of soluble ions can refer to a range of less than 0.75 molar to $10^{-7}$ molar soluble ion concentration, to a range of less than 0.1 molar to $10^{-7}$ molar soluble ion concentration, to a range of less than 0.01 molar to $10^{-7}$ molar soluble ion concentration, or even to a range of less than $10^{-3}$ molar to $10^{-7}$ molar soluble ion concentration.

It was discovered that batch constituents including water soluble alkali and alkaline earth species, ammonia, phosphates, sulfates, sodium, halides, organic acids, and the like contributed to soluble ions in the ceramic precursor batch composition. According to exemplary embodiments of the disclosure, the ceramic precursor batch composition can be substantially free of water soluble alkali and alkaline earth species, ammonia, phosphates, and sulfates. For example, the ceramic precursor batch composition can comprise less than 1 wt % $SO_3$, or even less than 0.5 wt % $SO_3$. The ceramic precursor batch composition can be substantially free of sodium, organic acid, such as lactic acid, halides, etc.

When the liquid vehicle in the honeycomb forming batch is water, the honeycomb forming batch can be substantially free of water soluble ions as described herein. In addition, when the liquid vehicle is other than water, such as alcohol or non-aqueous solution in the honeycomb forming batch, the principles of the disclosure still apply and ceramic precursor batch composition can be substantially free of ions soluble in the liquid vehicle as described herein.

The ceramic precursor batch composition includes inorganic ceramic-forming ingredients comprising 50-99.9 wt % an inorganic oxide composition. For example, ceramic precursor batch composition includes inorganic ceramic-forming ingredients comprising 50-98.9 wt % an inorganic oxide composition, or even 70-95 wt % an inorganic oxide composition. Inorganic oxide compositions can include at least one of titania ($TiO_2$), titanium hydroxide ($TiO(OH)_2$), zirconia ($ZrO_2$), zirconium hydroxide ($Zr(OH)_4$), and zeolite.

The ceramic precursor batch composition can include at least 0.1 wt % a catalytically active functional group. For example, ceramic precursor batch composition can include from about 0.01% to about 30% by weight of a catalytically active functional group. The catalytically active functional group includes at least one of vanadium (V), ruthenium (Ru), tungsten (W), molybdenum (Mo), zeolite, platinum (Pt), palladium (Pd), manganese (Mn), copper (Cu), nickel (Ni), compounds thereof, and promoted titanium. The catalytically active functional group can include vanadium pentoxide ($V_2O_5$), tungsten oxide ($WO_3$), molybdenum oxide ($MoO_3$), promoted titanium (Ti) species, platinum (Pt) group metals, gold (Au), silver (Ag), iridium (Ir), cerium (Ce), other transition and noble metals, and/or mixtures thereof. In some exemplary embodiments, the additional catalytically active functional groups can be part of the uniform composition used to form the outer peripheral and inner partition walls. In other exemplary embodiments, catalytically active functional groups can be coated or deposited onto at least one surface of the outer peripheral wall and inner partition walls. The depositing of catalytic material in or on the inner partition walls can be accomplished by aqueous impregnation, dip coating, washcoating, chemical vapor deposition, spraying of droplets, or other suitable techniques including any surface pre-treatment or post-treatments needed such as treatment with acid solution or thermal post-treatment.

The catalytically active functional groups can comprise 1-30% by weight of the structural catalyst body (honeycomb body). For example, the catalytically active functional group can comprise 5-15% by weight or 10% to 20% by weight of the structural catalyst body.

To form the ceramic precursor batch composition into a body, the body contains some liquid vehicle (e.g., water). The ceramic precursor batch composition can comprise a rheology capable of being extruded into a cellular product. The ceramic precursor batch composition mixed with the liquid vehicle can comprise a rheology as described by pressure (P) through a die or capillary=yield stress $(\tau_y)$+ extrusion constant (K)*(extrusion velocity $(V_1)$/diameter of capillary (D))$^n$. Where n is a unitless extrusion exponent. According to the exemplary embodiments of the disclosure, the yield stress $(\tau_y)$ can be 15-40 psi, for example, 18-32 psi, K can be 1-15 psi*s$^n$, n can be 0.2-0.5, and $V_1$ can be 0.5-4 in/second (See FIG. 4).

After forming the ceramic precursor batch composition into a body, the body contains some liquid (e.g., water), and typically at least some of the liquid must be removed and the wet body must be dried prior to firing at high temperature, which forms a refractory material. Drying may be accomplished by microwave drying, infrared heating, forced hot air drying, ambient air drying, and the like, and combinations thereof. The drying may be in humidity and temperature controlled environments.

To be capable of being microwave dried, the ceramic precursor batch composition can comprise a relative dielectric loss permittivity ($\in''$) of the wet composition at 915 MHz of less than 25, for example, the loss permittivity may be less than 20, or even less than 15, and a dielectric loss tangent (dissipation factor (tan δ)) of the wet composition at 915 MHz less than 0.6, for example, less than 0.4, or even less than 0.3. The dielectric loss tangent (dissipation factor) (tan δ) equals the ratio of the relative dielectric loss (loss permittivity) to the relative dielectric constant ($\in''/\in'$). To be capable of being microwave dried, the ceramic precursor batch composition may comprise a penetration depth "$D_{1/2P}$" greater than 2 cm. "$D_{1/2P}$" is the half-power penetration depth at which microwaves attenuate to half incident power. Where "$D_{1/2P}$" is expressed in meters by Equation (1).

$$D_{1/2P} = 0.347/a',$$  Equation (1)

and $$a' = \frac{2\pi}{\lambda}\left[\frac{\varepsilon'}{2}(\sqrt{1+\tan^2\delta}-1)\right]^{\frac{1}{2}}$$

Exemplary embodiments of the disclosure provide a green ware body including a plurality of channels, inorganic ceramic-forming ingredients comprising 50-98.9 wt % an inorganic oxide composition, and at least one of a temperature gelling cellulose ether and a soluble ion concentration of less than 0.75 molar. The green ware body can also include at least 0.1 wt % a catalytically active functional group. In alternative exemplary embodiments, the catalytically active functional group can be added after formation of the honeycomb body.

In these exemplary embodiments, the temperature gelling cellulose ether can be a cellulose-based polymer comprising at least one of methylcellulose, hydroxy-ethyl-methylcellulose and hydroxy-propyl-methylcellulose. The cellulose-based polymer can be present in 1 to 10 parts by weight based on the sum of the inorganic ceramic-forming ingredients being present in 100 parts by weight. For example, the cellulose-based polymer can be present in 1 to 5 parts by weight based on the sum of the inorganic ceramic-forming ingredients present in 100 parts by weight or even present in 2.25 to 3.25 parts by weight based on the sum of the inorganic ceramic-forming ingredients present in 100 parts by weight.

In these exemplary embodiments, the green ware body composition can be substantially free of soluble ions (soluble species). It was discovered that the soluble ions in the green ware body tend to interfere with extrusion of ceramic precursor batch through dies to form green ware body and drying of wet green ware, for example, preventing microwave drying. The green ware body according to exemplary embodiments of the disclosure can comprise a soluble ion concentration of less than 0.75 molar. The low soluble ion concentration was found to increase drying efficiency and facilitate extrusion of honeycomb structure having thin walls and high cell density. For example, the green ware body can comprise a soluble ion concentration of less than 0.1 molar, less than 0.01 molar, or even a soluble ion concentration of less than $10^{-3}$ molar.

It was discovered that batch constituents including water soluble alkali and alkaline earth species, ammonia, phosphates, sulfates, sodium, halides, organic acids, and the like contributed to soluble ions in the green ware body. According to exemplary embodiments of the disclosure, the green ware body can be substantially free of water soluble alkali and alkaline earth species, ammonia, phosphates, and sulfates. For example, the green ware body can comprise less than 1 wt % $SO_3$, or even less than 0.5 wt % $SO_3$. The green ware body can be substantially free of sodium, organic acid, such as lactic acid, halides, etc.

When the liquid vehicle in the green ware body is water, the green ware body can be substantially free of water soluble ions as described herein. In addition, when the liquid vehicle is other than water, such as alcohol or non-aqueous solution in the green ware body, the principles of the disclosure still apply and the green ware body can be substantially free of ions soluble in the liquid vehicle as described herein.

The green ware body includes inorganic ceramic-forming ingredients comprising 50-99.9 wt % an inorganic oxide composition. For example, the green ware body includes inorganic ceramic-forming ingredients comprising 50-98.9 wt % an inorganic oxide composition, or even 70-95 wt % an inorganic oxide composition. Inorganic oxide compositions can include at least one of titania ($TiO_2$), titanium hydroxide ($TiO(OH)_2$), zirconia ($ZrO_2$), zirconium hydroxide ($Zr(OH)_4$), and zeolite.

The green ware body can include at least 0.1 wt % a catalytically active functional group. For example, the green ware body can include from about 0.01% to about 30% by weight of a catalytically active functional group. The catalytically active functional group includes at least one of vanadium (V), ruthenium (Ru), tungsten (W), molybdenum (Mo), zeolite, platinum (Pt), palladium (Pd), manganese (Mn), copper (Cu), nickel (Ni), compounds thereof, and promoted titanium. The catalytically active functional group can include vanadium pentoxide ($V_2O_5$), tungsten oxide ($WO_3$), molybdenum oxide ($MoO_3$), promoted titanium (Ti) species, platinum (Pt) group metals, gold (Au), silver (Ag), iridium (Ir), cerium (Ce), other transition and noble metals, and/or mixtures thereof. In some exemplary embodiments, the additional catalytically active functional groups can be part of the uniform composition used to form the outer peripheral and inner partition walls. In other exemplary embodiments, catalytically active functional groups can be coated or deposited onto at least one surface of the outer peripheral wall and inner partition walls. The depositing of catalytic material in or on the inner partition walls can be accomplished by aqueous impregnation, dip coating, washcoating, chemical vapor deposition, spraying of droplets, or other suitable techniques including any surface pre-treatment or post-treatments needed such as treatment with acid solution or thermal post-treatment.

After forming the green ware body, the green ware body contains some liquid (e.g., water), and typically at least some of the liquid must be removed and the wet green ware body must be dried prior to firing at high temperature, which forms a refractory material. Drying may be accomplished by microwave drying, infrared heating, forced hot air drying, ambient air drying, and the like, and combinations thereof. The drying may be in humidity and temperature controlled environments.

Depending on the properties of the green ware body, microwave heating may unevenly heat a center region and outer edge region. Uneven heating can lead to stress fractures, shrinkage defects, and the like. To be capable of being microwave dried, the green ware body can comprise a wet bulk material with a relative dielectric loss permittivity ($\in''$) at 915 MHz of less than 25, for example, the loss permittivity may be less than 20, or even less than 15, and a wet ceramic green body with a relative dielectric loss permittivity at 915 MHz that is less than 25*CFA (25 multiplied by the fraction of closed frontal area), <20*CFA, and most preferably <15*CFA. The ceramic green ware body of these exemplary embodiments can comprise a dielectric loss tangent (dissipation factor (tan δ)) at 915 MHz in the wet ceramic green ware body of less than 0.6*CFA, for example, less than 0.4*CFA, or even less than 0.3*CFA in the axial direction. The dielectric loss tangent (dissipation factor) (tan δ) equals the ratio of the relative dielectric loss (loss permittivity) to the relative dielectric constant ($\in''/\in'$) in the axial direction. Where more precisely, $\tan \delta = \in''_{body}/\in'_{body} = (\in''_{bulk} CFA)/((1-CFA)+\in'_{bulk} CFA)$ in the axial direction. To be capable of being microwave dried, the green ware body can comprise a penetration depth "$D_{1/2P}$" greater than 2 cm in the axial direction. "$D_{1/2P}$" is the depth at which microwaves attenuate to half incident power. Where "$D_{1/2P}$" can be expressed generally by Equation (1) above and is a function of the green ware body structural geometry, for example, honeycomb channels or closed frontal area fraction (CFA) of the green ware body.

A ceramic green ware body of the present disclosure may be produced according to an exemplary embodiment by mixing up to 50-99.9% by weight an inorganic oxide composition, or a precursor which yields an inorganic oxide composition and a temperature gelling cellulose ether with a liquid vehicle to form a precursor batch, forming the precursor batch into a structure comprising a plurality of channels to form a wet ceramic green ware body, and drying the wet ceramic green ware body to form the ceramic green ware body. According to another exemplary embodiment, the ceramic green ware body can be produced by mixing up to 50-99.9% by weight an inorganic oxide composition, or a precursor which yields an inorganic oxide composition with a liquid vehicle to form a precursor batch, forming the precursor batch into a structure comprising a plurality of channels to form a wet ceramic green ware body wherein the wet ceramic green ware body comprises a soluble ion concentration of less than 0.75 molar, and drying the wet ceramic green ware body to form the ceramic green ware body.

According to these exemplary embodiments, at least 0.01% by weight a catalytically active functional group comprising, or a precursor which yields a catalytically active functional group can be included in the inorganic ceramic-forming ingredients and liquid vehicle to form the precursor batch. In some embodiments, the catalytically active functional group can be added directly to the inorganic oxide composition.

In these exemplary embodiments, the catalytically active functional group can be associated with support particles, such as titanium oxide and/or silicon oxide support particles, prior to mixing with the inorganic composition of the structural catalyst body. The support particles, in these exemplary embodiments, are coated with the catalytically active functional group. In other embodiments, the support particles are impregnated with the catalytically metal functional group. Once associated, the support particles and catalytically active functional group are mixed with the inorganic oxide composition of the structural catalyst body. As a result of the mixing, the support particles and associated catalytic material become imbedded and uniformly dispersed in the inorganic oxide composition.

In these exemplary embodiments, as provided herein, the catalytically active functional group can include at least one of vanadium (V), ruthenium (Ru), tungsten (W), molybdenum (Mo), zeolite, platinum (Pt), palladium (Pd), manganese (Mn), copper (Cu), nickel (Ni), compounds thereof, and promoted titanium. The catalytically active functional group can include vanadium pentoxide ($V_2O_5$), tungsten oxide ($WO_3$), molybdenum oxide ($MoO_3$), promoted titanium (Ti) species, platinum (Pt) group metals, gold (Au), silver (Ag), iridium (Ir), cerium (Ce), other transition and noble metals, and/or mixtures thereof.

In these exemplary embodiments, the catalytically active functional groups are part of the uniform composition which forms the structural catalyst body. In such embodiments, the catalytically active functional group can be added directly to the inorganic oxide composition or can be associated with support particles in a manner consistent with that described above. In a further embodiment, the catalytically active functional group can be incorporated into the structural catalyst body as part of a coating applied to a surface of the catalyst body or impregnated throughout the catalyst body.

The resulting catalytic mixture can be kneaded into a clay-like substance and subsequently extruded from an extrusion molding machine to form a honeycomb-like monolithic catalyst structure comprising the outer partition wall, inner partition walls and longitudinal flow channels.

In these exemplary embodiments, when the monolithic structural catalyst body is extruded, the extrusion formulation can comprise any number of peptizing agents, binding agents, extrusion aids, lubricants, plasticizers, reinforcement agents, and the like to assist in the extrusion process and/or generate the desired structural and pore properties for an intended application. Examples of materials that may be included in an extrusion formula include, but are not limited to, glass fibers or strands, silicon carbide fibers, cellulose compounds, starches, stearic alcohols, alcohols, graphite, stearic acid, oils, fats, and polymers. The extruded product, however, comprises a low soluble ion concentration as described above with respect to the ceramic precursor batch composition and the green ware body. Preferably the extruded product is free of carboxy methyl cellulose (CMC) and polyethylene oxide (PEO) as these binders can lead to a brittle extrusion. It was found that replacing CMC and PEO with cellulose ethers (hydroxy-propyl-methylcellulose) enabled extrusion of thin walls without adding multiple components. The extruded product may subsequently be dried or thermally treated. Moreover, in some embodiments, the extruded product may be subsequently deposited as described herein with additional catalyst material including metals such as a platinum group metal or other noble metal.

The extrusion system may include extruder machines, a filter or screen, and an extrusion die. The filter or screen may be utilized to facilitate passage of the mixture through the die, for example to reduce clogging of the die, without removing filler, binders, and reinforcement aids that provide advantageous product properties.

In these exemplary embodiments, drying the wet green ware body can include at least one of irradiating the wet ceramic green ware body with microwave radiation, irradiating the wet ceramic green ware body with radio frequency (RF) radiation, freezing the wet ceramic green ware body under vacuum to freeze-dry the wet ceramic green ware body, exposing the wet ceramic green ware body in a humidity controlled atmosphere, and exposing the wet ceramic green ware body to temperature controlled atmosphere.

Microwave drying can be dependent on the geometry of the part to be dried. For example, the wet ceramic green ware body can comprise a microwave penetration depth "$D_{1/2P}$" greater than 20% of the diameter of the ware in the radial direction perpendicular to the channels. That is, the microwave penetration in the radial direction is different than the microwave penetration in the axial direction for a honeycomb wet ceramic green ware body.

In these exemplary embodiments, the wet ceramic green ware body can comprise a microwave penetration depth "$D_{1/2P}$" in the axial direction of at least 2 cm.

In these exemplary embodiments, the method can include firing the ceramic green ware body to produce a porous ceramic honeycomb body. The porous ceramic honeycomb body can comprise a porosity of at least 15%, for example, at least 30%, at least 45%, or even at least 60%. The porous ceramic honeycomb body can comprise a wall thickness of less than 28 mils (0.7 mm), for example, a wall thickness of 5 to 20 mils (0.13-0.51 mm), or even a wall thickness of 9 to 10 mils (0.23-0.26 mm). The porous ceramic honeycomb body can comprise a cell density of greater than 10 cells per square inch (cpsi), for example, a cell density of greater than 20 cpsi, a cell density of greater than 40 cpsi, a cell density of greater than 100 cpsi, or even a cell density of greater than 200 cpsi. For example, the porous ceramic honeycomb body can comprise a cell density of greater than 300 cells per square inch (cpsi), for example, 325 cpsi, 400 cpsi, or even greater than 400 cpsi.

In these exemplary embodiments, honeycomb bodies can have a cell opening size of at least 5.5 mm, for example, a cell opening size of at least 6.0 mm. The honeycomb bodies can comprise hydraulic diameter of at least 145 mm and a transverse compressive strength of at least 1.5 kg/cm². For example, the hydraulic diameter can range from 145 mm to 160 mm. In a still further example, the hydraulic diameter can range from 152 mm to 154 mm.

In these exemplary embodiments, monolithic structural catalyst bodies can comprise an open frontal area greater than 40%. For example, an open frontal area greater than 55%, greater than 70%, or even greater than 85%. In a further embodiment, the structural catalyst body comprises a cell density of at least 1.5 cells/cm². In some embodiments, monolithic structural catalyst bodies of the present invention comprise a macroporosity greater than 0.05 cc/g in pores of diameter ranging from 600 to 5,000 Angstroms. Moreover, in some embodiments the cell opening size can be at least 6.3 mm. In some embodiments, a monolithic structural catalyst bodies comprises an open frontal area greater than or equal to 82%.

EXAMPLES

Exemplary embodiments of the disclosure are further described below with respect to certain exemplary and specific embodiments thereof, which are illustrative only and not intended to be limiting. In accordance with some of the embodiments, raw materials were used to prepare a series of ceramic articles having the general batch composition as provided in Table 1 for Exemplary Examples 3, 4, and 5 according to exemplary embodiments of the disclosure. Tables 2-4 for Comparative Examples 1 and 2 and Exemplary Examples 3-7 provide the dielectric properties of the Comparative and Exemplary Examples. Examples 3 and 7 are exemplary for extrusion compositions, and Examples 4, 5, and 6 are exemplary for drying and extrusion.

TABLE 1

|  | Example | | |
|---|---|---|---|
| Material | 3 | 4 | 5 |
| E-Glass Fiber - Milled | 84 | 84 | 84 |
| Methocel F240 | 33 | 33 | 33 |
| Organic Acid | 15 | 7 | 8 |
| Di Water | 620 | 620 | 620 |
| Ammonia (Aqua - 30% Ammonia) | 55 | 40 | 0 |
| Titania Powder - Anatase (1.6% $SO_3$) | 1072 |  | 1072 |
| Titania Powder - Anatase (0.3 wt % $SO_3$) |  | 1072 |  |

TABLE 2

| | | | | Frequency = 54.5 MHz Wet - RT | | | | |
|---|---|---|---|---|---|---|---|---|
| Sample | Formulation | % Moisture | Binder | $\epsilon'$ | $\epsilon''$ | tan δ | Half-Power Depth (cm) | Conductivity (Siemens/m) |
| 1 | Gas Substrate Form. 2 | 29.36 | CMC/PEO | 311.0 | 266.2 | 0.856 | 4.33 | 806190 |
| 2 | Standard Gas Product (V & W) | 25.43 | CMC/PEO | 185.7 | 137.6 | 0.741 | 6.37 | 416660 |

TABLE 2-continued

| | | | | Frequency = 54.5 MHz Wet - RT | | | | |
|---|---|---|---|---|---|---|---|---|
| Sample | Formulation | % Moisture | Binder | $\epsilon'$ | $\epsilon''$ | tan δ | Half-Power Depth (cm) | Conductivity (Siemens/m) |
| 3 | Gas Substrate Methocel 1 | 29.79 | Methocel | 183.4 | 431.3 | 2.351 | 2.54 | 1306372 |
| 4 | Gas Substrate Methocel 1-DT51D (Low Sulfur) | 29.19 | Methocel | 94.1 | 137.0 | 1.457 | 5.05 | 415085 |
| 5 | No Ammonia Methocel 1 | 29.75 | Methocel | 87.8 | 122.4 | 1.394 | 5.41 | 370629 |
| 6 | Methocel 1 @ Isoelectric Pt | 29.74 | Methocel | 147.4 | 262.4 | 1.781 | 3.46 | 794904 |
| 7 | Methocel 1 Low Moisture | 23.23 | Methocel | 156.5 | 428.7 | 2.739 | 2.48 | 1298572 |

TABLE 3

| | Frequency = 54.5 MHz Dry - RT | | | | |
|---|---|---|---|---|---|
| Sample | $\epsilon'$ | $\epsilon''$ | tan δ | Half-Power Depth (cm) | Conductivity (Siemens/m) |
| 1 | 6.82 | 0.04 | 0.006 | 3865 | 124 |
| 2 | 7.05 | 0.09 | 0.013 | 1810 | 270 |
| 3 | 6.81 | 0.01 | 0.001 | 31672 | 15 |
| 4 | 7.33 | 0.08 | 0.011 | 2080 | 239 |
| 5 | 6.79 | 0.02 | 0.003 | 9302 | 51 |
| 6 | 7.00 | 0.03 | 0.005 | 4865 | 100 |
| 7 | 8.26 | 0.03 | 0.003 | 6976 | 76 |

TABLE 4

| | Frequency = 600 MHz Wet - RT | | | | | Frequency = 600 MHz Dry - RT | | | | |
|---|---|---|---|---|---|---|---|---|---|---|
| Sample | $\epsilon'$ | $\epsilon''$ | tan δ | Half-Power Depth (cm) | Conductivity (Siemens/m) | $\epsilon'$ | $\epsilon''$ | tan δ | Half-Power Depth (cm) | Conductivity (Siemens/m) |
| 1 | 55.9 | 54.2 | 0.969 | 0.83 | 1807196 | 6.91 | 0.03 | 0.0036 | 579.6 | 834 |
| 2 | 48.9 | 41.2 | 0.843 | 1.00 | 1374555 | 6.95 | 0.05 | 0.0068 | 309.2 | 1567 |
| 3 | 56.1 | 49.8 | 0.889 | 0.90 | 1661804 | 6.74 | 0.04 | 0.0064 | 332.8 | 1434 |
| 4 | 50.3 | 17.3 | 0.345 | 2.29 | 578234 | 7.23 | 0.05 | 0.0066 | 308.8 | 1601 |
| 5 | 49.0 | 16.1 | 0.330 | 2.42 | 538184 | 6.81 | 0.03 | 0.0041 | 513.7 | 934 |
| 6 | 53.7 | 32.5 | 0.605 | 1.29 | 1084671 | 6.93 | 0.04 | 0.0058 | 362.8 | 1334 |
| 7 | 51.3 | 47.5 | 0.926 | 0.90 | 1584473 | 8.08 | 0.05 | 0.0061 | 319.8 | 1634 |

A curve fit extrapolation was performed to obtain the data in Table 5 for wet and dry properties at 915 MHz.

Data used for extrapolated values in Table 5 is presented in Tables 6 and 7.

TABLE 6

| | Wet Properties | | | |
|---|---|---|---|---|
| Frequency | $\epsilon'$ | $\epsilon''$ | tan δ | |
| | Sample 1 | | | |
| 163 | 100.7 | 164.8 | 1.637 | |
| 272 | 73.4 | 105.8 | 1.441 | |
| 381 | 63.1 | 78.1 | 1.239 | |
| 490 | 57.9 | 64.3 | 1.111 | |
| 600 | 55.9 | 54.2 | 0.969 | |

TABLE 5

| | Frequency = 915 MHz Wet - RT | | | | | Frequency = 915 MHz Dry - RT | | | | |
|---|---|---|---|---|---|---|---|---|---|---|
| Sample | $\epsilon'$ | $\epsilon''$ | tan δ | Half-Power Depth (cm) | Conductivity (Siemens/m) | $\epsilon'$ | $\epsilon''$ | tan δ | Half-Power Depth (cm) | Conductivity (Siemens/m) |
| 1 | 43.8 | 37.6 | 0.859 | 0.69 | 1910942 | 6.891 | 0.166 | 0.024 | 57.3 | 8426 |
| 2 | 38.4 | 32.0 | 0.833 | 0.75 | 1628531 | 6.885 | 0.114 | 0.017 | 83.0 | 5813 |
| 3 | 50.6 | 33.5 | 0.662 | 0.80 | 1704299 | 6.767 | 0.094 | 0.014 | 100 | 4796 |
| 4 | 47.4 | 11.9 | 0.250 | 2.12 | 602913 | 7.110 | 0.040 | 0.006 | 239 | 2053 |
| 5 | 46.3 | 11.1 | 0.240 | 2.22 | 566444 | 6.761 | 0.021 | 0.003 | 458 | 1044 |
| 6 | 48.6 | 22.2 | 0.458 | 1.16 | 1131322 | 6.887 | −0.023* | na | na | na |
| 7 | 47.2 | 31.7 | 0.672 | 0.82 | 1612749 | 7.975 | 0.042 | 0.005 | 242 | 2142 |

*extrapolates to a negative number, $\epsilon''$ cannot be negative

TABLE 6-continued

| | Wet Properties | | |
|---|---|---|---|
| Frequency | ε' | ε" | tan δ |
| Sample 2 | | | |
| 163 | 96.4 | 93.4 | 0.969 |
| 272 | 72.1 | 70.1 | 0.973 |
| 381 | 59.9 | 56.1 | 0.937 |
| 490 | 52.9 | 47.8 | 0.903 |
| 600 | 48.9 | 41.2 | 0.842 |
| Sample 3 | | | |
| 163 | 72.4 | 159.4 | 2.203 |
| 272 | 63.8 | 98.5 | 1.543 |
| 381 | 59.3 | 72.6 | 1.225 |
| 490 | 57.1 | 58.3 | 1.020 |
| 600 | 56.1 | 49.8 | 0.889 |
| Sample 4 | | | |
| 163 | 58.7 | 52.8 | 0.900 |
| 272 | 54.0 | 33.6 | 0.623 |
| 381 | 52.1 | 24.9 | 0.478 |
| 490 | 51.1 | 20.2 | 0.396 |
| 600 | 50.3 | 17.3 | 0.345 |
| Sample 5 | | | |
| 163 | 56.0 | 47.3 | 0.846 |
| 272 | 52.4 | 30.6 | 0.584 |
| 381 | 50.3 | 22.7 | 0.452 |
| 490 | 49.6 | 18.7 | 0.377 |
| 600 | 49.0 | 16.1 | 0.330 |
| Sample 6 | | | |
| 163 | 69.1 | 102.1 | 1.478 |
| 272 | 60.2 | 63.6 | 1.057 |
| 381 | 56.2 | 47.1 | 0.839 |
| 490 | 54.8 | 38.6 | 0.705 |
| 600 | 53.7 | 32.5 | 0.605 |
| Sample 7 | | | |
| 163 | 66.6 | 158.6 | 2.383 |
| 272 | 59.5 | 98.0 | 1.648 |
| 381 | 55.6 | 70.6 | 1.269 |
| 490 | 53.6 | 56.4 | 1.053 |
| 600 | 51.3 | 47.5 | 0.926 |

TABLE 7

| | Dry Properties | | |
|---|---|---|---|
| Frequency | ε' | ε" | tan δ |
| Sample 1 | | | |
| 163 | 6.94 | 0.016 | 0.002 |
| 272 | 6.93 | 0.000 | 0.000 |
| 381 | 6.93 | 0.000 | 0.000 |
| 490 | 6.92 | 0.009 | 0.001 |
| 600 | 6.91 | 0.025 | 0.004 |
| Sample 2 | | | |
| 163 | 7.02 | 0.058 | 0.008 |
| 272 | 7.03 | 0.036 | 0.005 |
| 381 | 6.98 | 0.042 | 0.006 |
| 490 | 6.96 | 0.040 | 0.006 |
| 600 | 6.95 | 0.047 | 0.007 |
| Sample 3 | | | |
| 163 | 6.77 | 0.030 | 0.004 |
| 272 | 6.77 | 0.026 | 0.004 |
| 381 | 6.75 | 0.027 | 0.004 |
| 490 | 6.74 | 0.039 | 0.006 |
| 600 | 6.74 | 0.043 | 0.006 |

TABLE 7-continued

| | Dry Properties | | |
|---|---|---|---|
| Frequency | ε' | ε" | tan δ |
| Sample 4 | | | |
| 163 | 7.32 | 0.055 | 0.008 |
| 272 | 7.31 | 0.059 | 0.008 |
| 381 | 7.28 | 0.072 | 0.010 |
| 490 | 7.26 | 0.058 | 0.008 |
| 600 | 7.23 | 0.048 | 0.007 |
| Sample 5 | | | |
| 163 | 6.84 | 0.024 | 0.004 |
| 272 | 6.87 | 0.037 | 0.005 |
| 381 | 6.85 | 0.031 | 0.005 |
| 490 | 6.84 | 0.032 | 0.005 |
| 600 | 6.81 | 0.028 | 0.004 |
| Sample 6 | | | |
| 163 | 6.99 | 0.060 | 0.009 |
| 272 | 6.98 | 0.037 | 0.005 |
| 381 | 6.97 | 0.033 | 0.005 |
| 490 | 6.94 | 0.034 | 0.005 |
| 600 | 6.93 | 0.004 | 0.001 |
| Sample 7 | | | |
| 163 | 8.19 | 0.005 | 0.001 |
| 272 | 8.19 | 0.048 | 0.006 |
| 381 | 8.14 | 0.047 | 0.006 |
| 490 | 8.11 | 0.037 | 0.005 |
| 600 | 8.08 | 0.049 | 0.006 |

Figure 2:
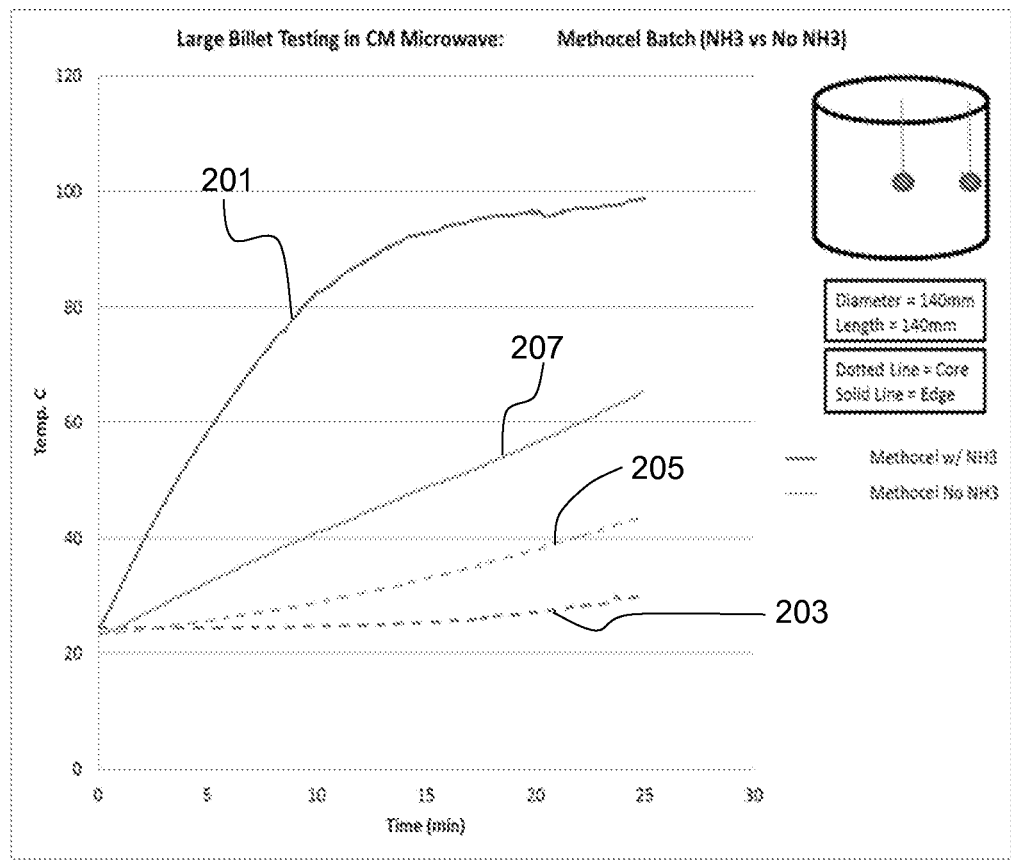
FIG. 2 shows a graphical plot of microwave heating data for a Comparative Example and an Exemplary Example according to an exemplary embodiment of the disclosure.

FIG. 2 shows a graphical plot of microwave heating data for a Comparative Example and an Exemplary Example according to an exemplary embodiment of the disclosure. Large billets having diameter of 140 mm and length 140 mm were subjected to microwave drying at a frequency of 2450 MHz. Plot 201 shows the outside edge of the Comparative Example was quickly heated. Plot 203 shows the core of the Comparative Example was hardly heated resulting in a large edge to core temperature difference or delta. The Comparative Example comprised $NH_3$. In contrast, the Exemplary Example was substantially free of $NH_3$. Plot 205 shows the outside edge and the core (plot 207) of the Exemplary Example were more evenly heated. The Exemplary Example had a much lower edge to core temperature difference or delta.

Figure 3:
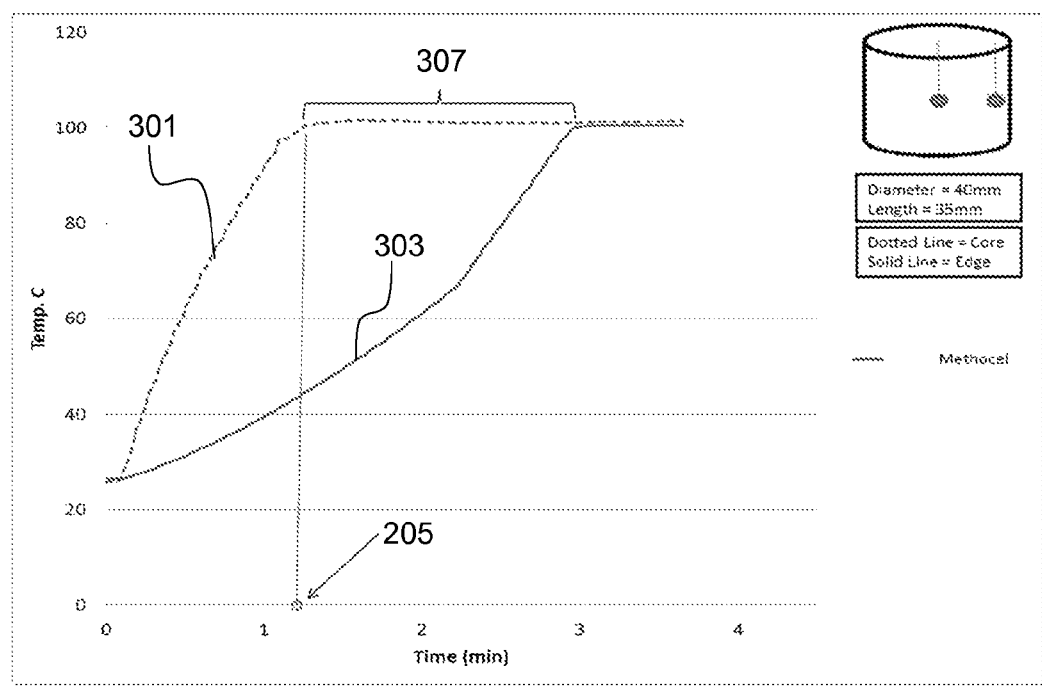
FIG. 3 shows a schematic example graphical plot of microwave drying data to show how the edge to core temperature difference (delta) was determined for small billets.

FIG. 3 shows a schematic example graphical plot of microwave drying data to show how the edge to core temperature difference (delta) was determined for small billets. The time when the small billet core reached 100° C. was subtracted from the time when the edge of the small billet reached 100° C. under microwave drying. The small billets were 40 mm in diameter and 35 mm in length. Line 301 represents core heating and line 303 represents edge heating. 305 is time when core reaches 100° C. 307 represents edge to core delta.

Table 8 shows the edge to core delta for six Exemplary Examples. A positive edge to core delta indicates good microwave core penetration behavior leading to even drying and less drying defects. In contrast, a negative edge to core delta indicates poor microwave core penetration behavior that can lead to high temperature differential stresses, defects, and burning of portions of the billet without drying other portions.

TABLE 8

| Sample | Batch Type | SO$_3$ in Powder (%) | Conductivity (µS/cm) | pH | MW Edge-Core Delta at 100° C. (sec) | Time (min) when Core reaches 100° C. |
|---|---|---|---|---|---|---|
| 9 | Methocel with Ammonia | 1.34 | 2000 | 8.0 | −119 | 5.91 |
| 10 | Methocel No Ammonia | 1.34 | 975 | 2.9 | +130 | 1.22 |
| 11 | Methocel with Ammonia | 0.33 | 740 | 8.6 | +103 | 1.25 |
| 12 | Methocel No Ammonia, No Lactic Acid, with Zusoplast | 1.34 | 430 | 3.2 | +125 | 0.64 |
| 13 | Methocel No Ammonia with MEA | 1.34 | 880 | 8.2 | −37 | 2.33 |
| 14 | Methocel No Ammonia with NaOH | 1.34 | 1880 | 8.3 | −26 | 3.23 |

Figure 4:
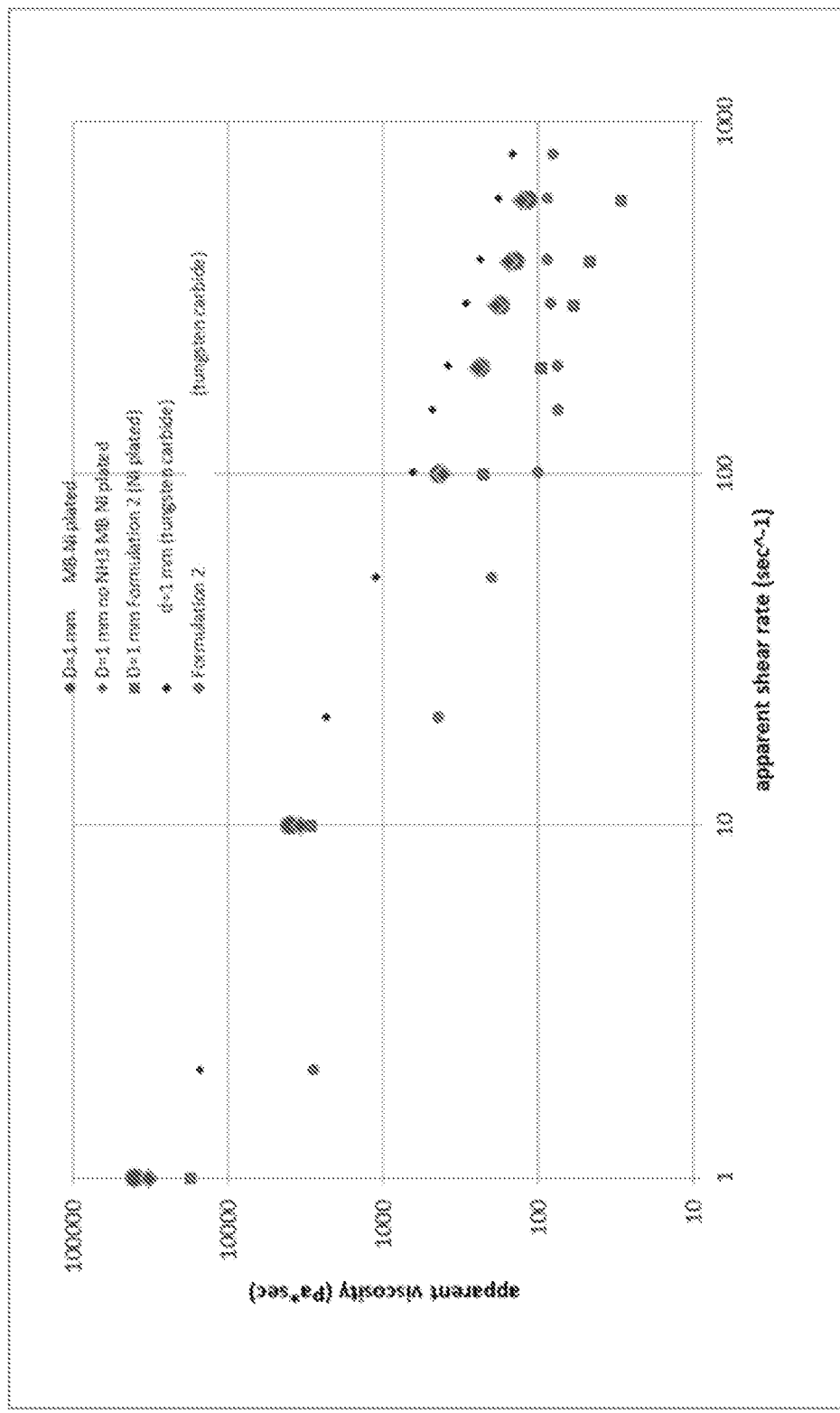
FIG. 4 is a graphical plot of data of the apparent viscosity curve of Exemplary Examples according to exemplary embodiments of the disclosure.

FIG. 4 is a graphical plot of data of the apparent viscosity curve of Exemplary Examples according to exemplary embodiments of the disclosure.

Accordingly, advantages of exemplary embodiments of the disclosure include elimination of ammonia from ceramic precursor batch compositions and green ware bodies minimizes the Health, Safety, and Environment (HSE) requirements while providing satisfactory extrusion properties. Use of cellulose ethers (hydroxy-propyl-methylcellulose), for example, instead of carboxy methyl cellulose (CMC) and poly ethylene oxide (PEO) overcame brittle extrusion and enabled extrusion of thinwall without multiple components. Reduction of sulfur (S) in the inorganic oxide composition, for example, titania (TiO$_2$), and the elimination of ammonium hydroxide in the ceramic precursor batch composition and the green ware body enables the use of microwave drying and the ability to couple with the field, leading to reduction of drying time by 70%.

Reference throughout this specification to exemplary embodiments and similar language throughout this specification may, but do not necessarily, refer to the same embodiment. Furthermore, the described features, structures, or characteristics of the subject matter described herein with reference to an exemplary embodiment may be combined in any suitable manner in one or more exemplary embodiments. In the description, numerous specific details are provided, such as examples of, materials, coatings, channel and honeycomb body geometry, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

The methods described above are generally set forth as logical flow. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Additionally, the order in which a particular method occurs may or may not strictly adhere to the order of the corresponding steps shown.

It will be apparent to those skilled in the art that various modifications and variations can be made in the illustrated exemplary embodiments without departing from the spirit or scope of the disclosure. Thus, it is intended that the present disclosure cover the modifications and variations provided they come within the scope of the appended claims and their equivalents.

The invention claimed is:

1. A ceramic precursor batch composition, comprising:
    inorganic ceramic-forming ingredients comprising 50-98.9 wt % an inorganic oxide composition; and
    a temperature gelling cellulose ether,
        wherein the batch composition comprises a soluble ion concentration of less than 0.75 molar,
        wherein, in a wet state, the batch composition comprises a dielectric loss tangent at 915 MHz of less than 0.6, and
        wherein the dielectric loss tangent (tan δ) equals the ratio of the relative dielectric loss to the relative dielectric constant (∈"/∈').

2. The composition of claim 1, wherein the soluble ions comprise any of water soluble alkali and alkaline earth species, ammonia, phosphates, sulfates, organic acid, halides, and combinations thereof.

3. The composition of claim 1, wherein the temperature gelling cellulose ether is present in 1 to 10 parts by weight and the sum of the inorganic ceramic-forming ingredients is present in 100 parts by weight.

4. The composition of claim 1, further comprising a rheology capable of being extruded into a cellular product.

5. A ceramic precursor batch composition, comprising:
    inorganic ceramic-forming ingredients comprising 50-98.9 wt % an inorganic oxide composition; and
    a temperature gelling cellulose ether,
        wherein the batch composition comprises a soluble ion concentration of less than 0.75 molar, and
        wherein the inorganic oxide composition comprises less than 1 wt % SO$_3$.

6. The composition of claim 1, wherein the inorganic oxide composition comprises at least one of titania, titanium hydroxide, zirconia, zirconium hydroxide, zeolite, and combinations thereof.

7. A ceramic precursor batch composition, comprising:
    inorganic ceramic-forming ingredients comprising 50-98.9 wt % an inorganic oxide composition; and
    a temperature gelling cellulose ether,
        wherein the batch composition comprises a soluble ion concentration of less than 0.75 molar, and
        wherein the batch composition comprises at least 0.1 wt % a catalytically active functional group.

8. A ceramic precursor batch composition, comprising:
    inorganic ceramic-forming ingredients comprising 50-98.9 wt % an inorganic oxide composition; and a temperature gelling cellulose ether,
wherein the batch composition comprises a soluble ion concentration of less than 0.75 molar, and
wherein, in a wet state, a relative dielectric loss of the wet batch composition at 915 MHz is less than 25.

9. A ceramic green ware body, comprising:
a plurality of channels;
inorganic ceramic-forming ingredients comprising 50-98.9 wt % an inorganic oxide composition; and
a temperature gelling cellulose ether,
wherein the ceramic green ware body comprises a soluble ion concentration of less than 0.75 molar,
wherein, in a wet state, the ceramic green ware body comprises a dielectric loss tangent at 915 MHz of less than 0.6*CFA (closed frontal area fraction) in an axial direction, and
wherein the dielectric loss tangent (tan δ) is equal to the ratio of the relative dielectric loss to the relative dielectric constant $(\varepsilon''_{body}/\varepsilon'_{body})=(\varepsilon''_{bulk} \, CFA)/((1-CFA)+\varepsilon'_{bulk} \, CFA)$.

10. The ceramic green ware body of claim 9, wherein the soluble ions comprise any of water soluble alkali and alkaline earth species, ammonia, phosphates, sulfates, organic acid, halides, and combinations thereof.

11. A ceramic green ware body, comprising:
a plurality of channels;
inorganic ceramic-forming ingredients comprising 50-98.9 wt % an inorganic oxide composition; and
a temperature gelling cellulose ether,
wherein the ceramic green ware body comprises a soluble ion concentration of less than 0.75 molar, and
wherein the ceramic green ware body comprises at least 0.1 wt % a catalytically active functional group.

12. The ceramic green ware body of claim 11, wherein the catalytically active functional group comprises at least one of V, Ru, W, Mo, zeolite, Pt, Pd, Mn; Cu, Ni, and promoted titanium.

13. A ceramic green ware body, comprising:
a plurality of channels;
inorganic ceramic-forming ingredients comprising 50-98.9 wt % an inorganic oxide composition; and
a temperature gelling cellulose ether,
wherein the ceramic green ware body comprises a soluble ion concentration of less than 0.75 molar, and
wherein the ceramic green ware body comprises a wet bulk material with a relative dielectric loss at 915 MHz of less than 25, and a wet relative dielectric loss of the ceramic green body at 915 MHz that is less than 25*CFA (25 multiplied by the fraction of closed frontal area).

14. A method of making a ceramic green ware body, comprising:
mixing a temperature gelling cellulose ether and inorganic ceramic-forming ingredients comprising 50-98.9 wt % an inorganic oxide composition with a liquid vehicle to form a precursor batch;
forming the precursor batch into a structure comprising a plurality of channels to form a wet ceramic green ware body,
wherein the wet ceramic green ware body comprises a soluble ion concentration of less than 0.75 molar,
wherein the wet ceramic green ware body comprises a dielectric loss tangent at 915 MHz in the wet ceramic green ware body of less than 0.6*CFA (closed frontal area fraction) in the axial direction,
wherein the dielectric loss tangent (tan δ) equals the ratio of the relative dielectric loss to the relative dielectric constant $(\varepsilon''/\varepsilon')$,
wherein the wet ceramic green ware body comprises a microwave penetration depth "$D_{1/2P}$" in the axial direction of at least 2 cm, and
wherein $D_{1/2P}$ is a function of the green ware CFA (closed frontal area fraction); and
drying the wet ceramic green ware body to form the ceramic green ware body.

15. The method of claim 14, further comprising:
firing the ceramic green ware body to produce a porous ceramic honeycomb body.

16. A method of making a ceramic green ware body, comprising:
mixing a temperature gelling cellulose ether and inorganic ceramic-forming ingredients comprising 50-98.9 wt % an inorganic oxide composition with a liquid vehicle to form a precursor batch,
mixing at least 0.1 wt % a catalytically active functional group with the temperature gelling cellulose ether, the inorganic ceramic-forming ingredients and the liquid vehicle to form the precursor batch;
forming the precursor batch into a structure comprising a plurality of channels to form a wet ceramic green ware body, wherein the wet ceramic green ware body comprises a soluble ion concentration of less than 0.75 molar; and
drying the wet ceramic green ware body to form the ceramic green ware body.

17. A method of making a ceramic green ware body, comprising:
mixing a temperature gelling cellulose ether and inorganic ceramic-forming ingredients comprising 50-98.9 wt % an inorganic oxide composition with a liquid vehicle to form a precursor batch;
forming the precursor batch into a structure comprising a plurality of channels to form a wet ceramic green ware body,
wherein the wet ceramic green ware body comprises a soluble ion concentration of less than 0.75 molar,
wherein the wet ceramic green ware body comprises a wet bulk material with a relative dielectric loss at 915 MHz of less than 25, and the wet ceramic green ware body has a relative dielectric loss at 915 MHz that is less than 25*CFA (25 multiplied by the fraction of closed frontal area),
wherein the wet ceramic green ware body comprises a microwave penetration depth "$D_{1/2P}$" that is greater than 20% of the diameter of the ware in the radial direction perpendicular to the channels, and
wherein $D_{1/2P}$ is a function of the green ware CFA (closed frontal area fraction); and
drying the wet ceramic green ware body to form the ceramic green ware body.

18. A ceramic green ware body, comprising:
a plurality of channels;
inorganic ceramic-forming ingredients comprising 50-98.9 wt % an inorganic oxide composition; and
a temperature gelling cellulose ether,
wherein the ceramic green ware body comprises a soluble ion concentration of less than 0.75 molar, and
wherein the ceramic green ware body comprises less than 1 wt % $SO_3$.

19. A method of making a ceramic green ware body, comprising:

mixing a temperature gelling cellulose ether and inorganic ceramic-forming ingredients comprising 50-98.9 wt % an inorganic oxide composition with a liquid vehicle to form a precursor batch, wherein the inorganic oxide composition comprises less than 1 wt % $SO_3$;

forming the precursor batch into a structure comprising a plurality of channels to form a wet ceramic green ware body, wherein the wet ceramic green ware body comprises a soluble ion concentration of less than 0.75 molar; and drying the wet ceramic green ware body to form the ceramic green ware body.

* * * * *

UNITED STATES PATENT AND TRADEMARK OFFICE
CERTIFICATE OF CORRECTION

PATENT NO. : 9,957,200 B2
APPLICATION NO. : 15/038971
DATED : May 1, 2018
INVENTOR(S) : Douglas Munroe Beall et al.

Page 1 of 1

It is certified that error appears in the above-identified patent and that said Letters Patent is hereby corrected as shown below:

In the Claims

In Column 19, Line 5, Claim 8, before "batch" delete "wet".

In Column 19, Line 38, Claim 12, delete "Mn;" and insert -- Mn, --, therefor.

Signed and Sealed this
First Day of August, 2023

*Katherine Kelly Vidal*

Katherine Kelly Vidal
*Director of the United States Patent and Trademark Office*